United States Patent [19]

Checko

[11] 4,295,914

[45] Oct. 20, 1981

[54] APPARATUS FOR APPLYING SEALANT MATERIAL TO A WORKPIECE

[76] Inventor: John C. Checko, 5 Northern Dr., Bridgewater, N.J. 08807

[21] Appl. No.: 68,691

[22] Filed: Aug. 22, 1979

[51] Int. Cl.[3] ........................ B32B 31/04; B32B 31/14

[52] U.S. Cl. .................................... 156/357; 118/408; 118/410; 118/503; 156/563

[58] Field of Search ............... 118/410, 408, 503, 684, 118/236; 156/109, 578, 556, 357, 563

[56] References Cited

U.S. PATENT DOCUMENTS

| | | | |
|---|---|---|---|
| 2,488,519 | 11/1949 | Andrews et al. | 118/684 X |
| 3,173,170 | 3/1965 | Reusch | 118/410 X |
| 3,205,853 | 9/1965 | Wampler et al. | 118/323 X |
| 3,759,771 | 9/1973 | Battersby | 156/109 |
| 3,765,993 | 10/1973 | Raffensparger et al. | 156/563 |
| 3,962,024 | 6/1976 | Stehl | 156/539 |

OTHER PUBLICATIONS

Glasgow Products, Inc. Brochure, Reprinted from Glass Digest, Jun. 1977 issue.

Sommer & Maca Industries, Inc. Bulletin 1979-1981.

*Primary Examiner*—John P. McIntosh

*Attorney, Agent, or Firm*—Weinstein & Sutton

[57] ABSTRACT

The apparatus includes a work supporting table for receiving a glass assembly, and aligning apparatus for properly orienting and aligning the glass panels and spacers of the glass assembly relative to each other and relative to a sealant applying nozzle. A clamping assembly is provided to clamp the glass assembly and maintain it in its properly aligned position so that the sealant material can be applied to the edge of the glass assembly. A sealant applying head is mounted for movement relative to an edge of the workpiece which includes a nozzle assembly for applying sealant material to the workpiece as it moves relative to it. The sealant applying head is driven by a motor and chain arrangement and carries a sensor for sensing the edge of the glass. In response to reaching the end of the glass assembly, the sensor actuates a reversal of the driving motor to reverse the movement of the sealant applying head so that it is returned to its initial position. During its return movement, the sealant applying head is pivoted away from the glass assembly. Thereafter, the glass assembly is turned and again aligned and clamped so that the sealant material can be applied to another edge of the glass assembly.

13 Claims, 9 Drawing Figures

APPARATUS FOR APPLYING SEALANT MATERIAL TO A WORKPIECE

FIELD OF THE INVENTION

The present invention relates generally to applying sealant material to insulating glass assemblies, and specifically to an apparatus for automatically aligning, clamping and applying sealant to an insulating glass assembly.

BACKGROUND OF THE INVENTION

Insulating glass includes an assembly of two sheets of panels of glass separated by one or more spacers so that there is a layer of insulating air between the two panels of glass. To seal in the insulating layer of air, a sealant material must be applied to each edge of the glass panels in the space formed between the spacer and the edges of the glass panels. In order to form a good seal, the two glass panels must be accurately aligned relative to each other, and, in addition, the spacer along each edge of the glass assembly must be properly spaced and aligned relative to the two glass panels. As a still further condition for forming a good seal, the glass assembly and spacers must be maintained in proper alignment while the sealant material is being applied thereto. Finally, the sealant material must be applied in such a way that it is uniform and covers the entire edge of the glass assembly.

Although apparatus has been developed in the past for handling insulating glass assemblies and applying sealant material to the edges, such apparatus has not been totally satisfactory. In one prior art system, a stationary header applies the sealant material to the glass assembly as it moves along a work support. However, one of the problems of such an arrangement is that it is difficult to keep the glass assembly and spacers properly aligned, relative to each other as it moves relative to the stationary header. As a result, defects in the seal are likely to occur.

In another prior art arrangement, the sealant material is applied to a frame formed by the aluminum spacers, and then the spacer frame with the sealant material applied thereto is taken to another station where the glass panels are adhered to the spacer frame. The glass assembly is then transferred to a vertically arranged heating and compression station to heat and compress the assembly. As will be understood, such an arrangement is time consuming, expensive, requires many work stations and is not automatic. Accordingly, this system has also not been entirely satisfactory.

Broadly, it is an object of the present invention to provide an improved system for applying sealant material to an insulating glass assembly which overcomes one or more of the aforesaid problems. Specifically, it is within the contemplation of the present invention to provide an improved system which automatically aligns, clamps, and applies sealant material to a glass assembly in a precise and uniform manner.

It is a further object of the present invention to provide an improved sealant applying system which automatically aligns the glass panels and spacers of the glass assembly, relative to each other and relative to a sealant applying nozzle, and which automatically clamps the aligned glass assembly to maintain it in proper alignment so that the sealant material can be applied thereto.

It is a still further object of the present invention to provide an improved sealant applying apparatus wherein the glass assembly is held in a stationary position while the sealant head automatically applies the sealant material to and edge of the glass assembly.

SUMMARY OF THE INVENTION

Briefly, in accordance with the principles of the present invention, there is provided an improved apparatus for aligning, clamping and applying sealant material to a workpiece, such as an insulating glass assembly. The apparatus includes a work supporting table for receiving the work assembly, and aligning apparatus for properly orienting and aligning the glass panels and spacers of the glass assembly relative to each other and relative to the sealant applying nozzle. Once the glass assembly is properly aligned, a clamping assembly is actuated to clamp the glass assembly and maintain it in its properly aligned position so that the sealant material can be applied to the edge of the glass assembly. The present invention further includes a sealant applying head mounted for movement relative to an edge of the workpiece which includes a nozzle assembly for applying sealant material to the workpiece as it moves relative to it. The sealant applying head is driven by a motor and chain arrangement and carries a sensor for sensing the edge of the glass. In response to reaching the end of the glass assembly, the sensor actuates a reversal of the driving motor to reverse the movement of the sealant applying head so that it is returned to its initial position. During its return movement, the sealant applying head is pivoted away from the glass assembly. Thereafter, the glass assembly is turned and again aligned and clamped so that the sealant material can be applied to another edge of the glass assembly.

Advantageously, as a result of the present invention, an improved apparatus has been provided for applying the sealant material to an insulating glass assembly in an efficient and simple manner, and which is suitable for mass production techniques. In addition, the present invention assures that the sealant material is applied precisely, uniformly and entirely covering the edges of the glass assembly.

BRIEF DESCRIPTION OF THE DRAWINGS

Further objects, features, and advantages of the present invention will become apparent upon consideration of the detailed description of the presently preferred embodiment when taken in conjunction with the accompanying drawings, wherein.

DETAILED DESCRIPTION OF THE PREFERRED EMBODIMENT

Figure 1:
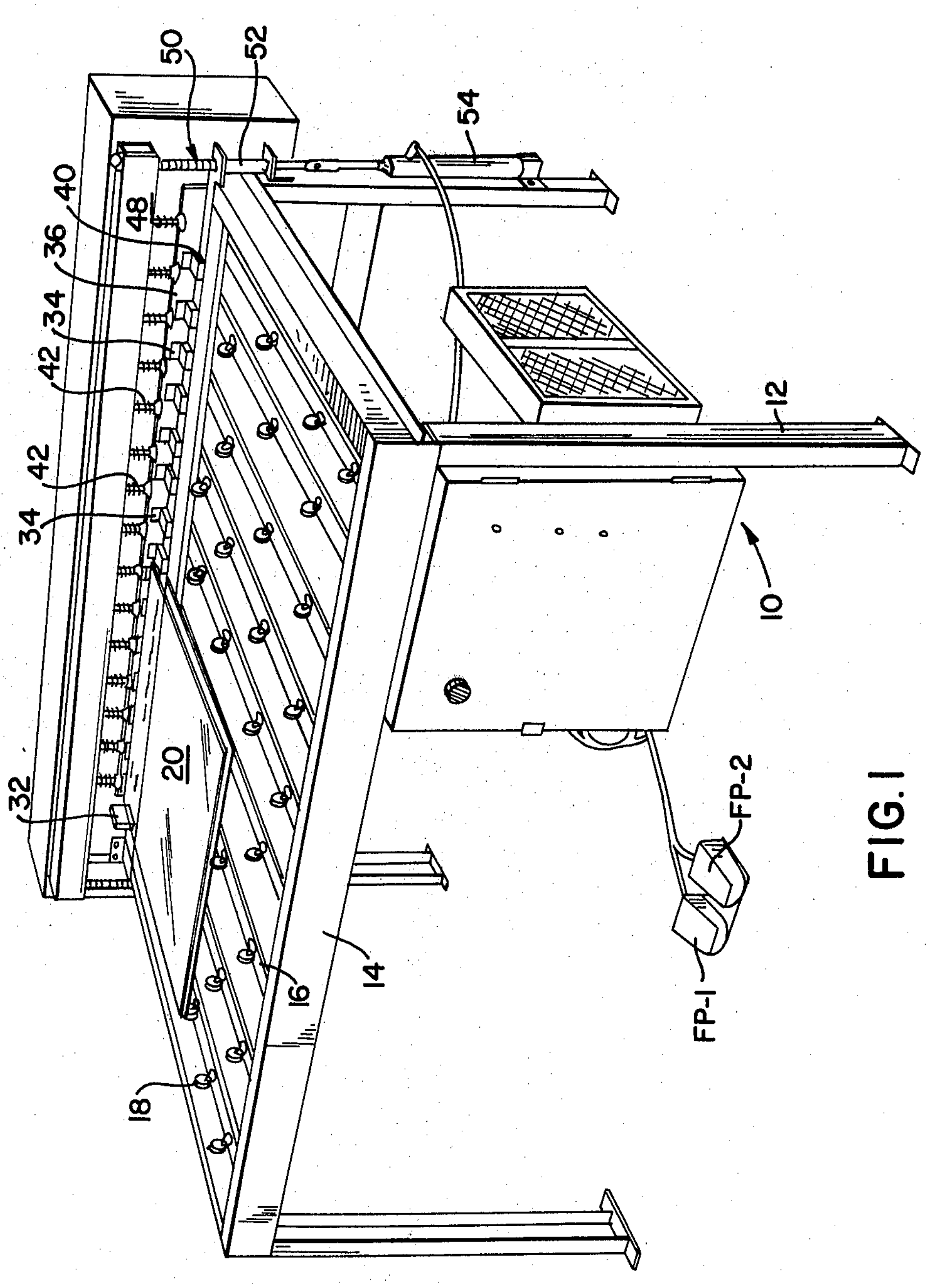
FIG. 1 is a perspective view of a sealant applying apparatus embodying the present invention.

Referring now to FIG. 1, there is shown an apparatus embodying the present invention, generally designated by the reference numeral 10. The apparatus includes a frame 12 which includes a work supporting table 14 having a plurality of crossbar members 16, each of which supports a plurality of roller members 18. In this manner, the workpiece 20 may be placed on the work supporting table 14 and easily moved about on the rollers 18.

Figure 2:
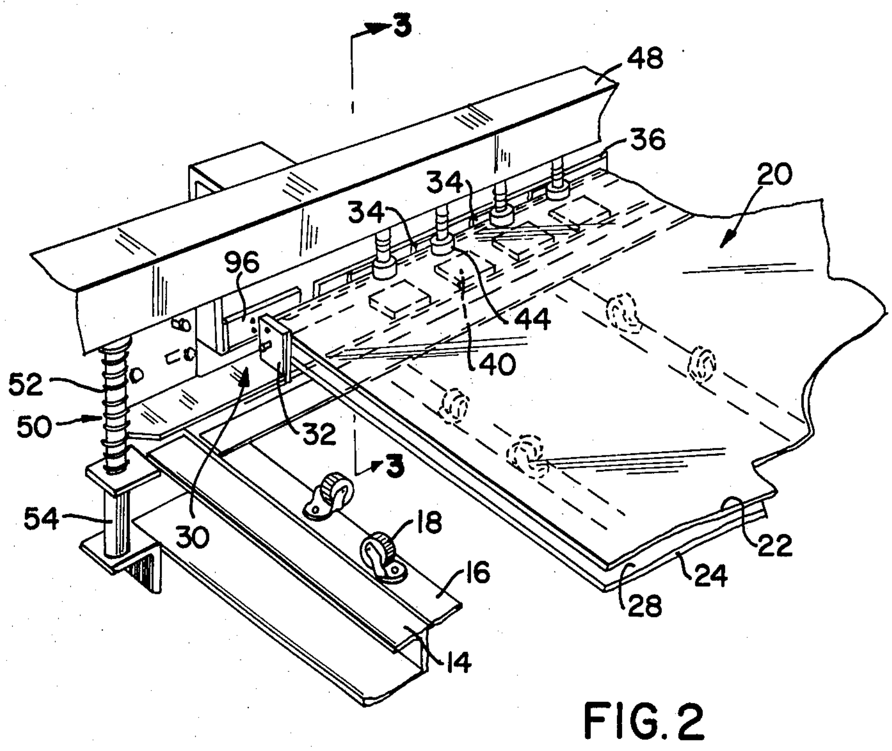
FIG. 2 is a perspective view of part of the apparatus shown in FIG. 1 illustrating in detail the aligning and clamping apparatus of the present invention.
Figure 3:
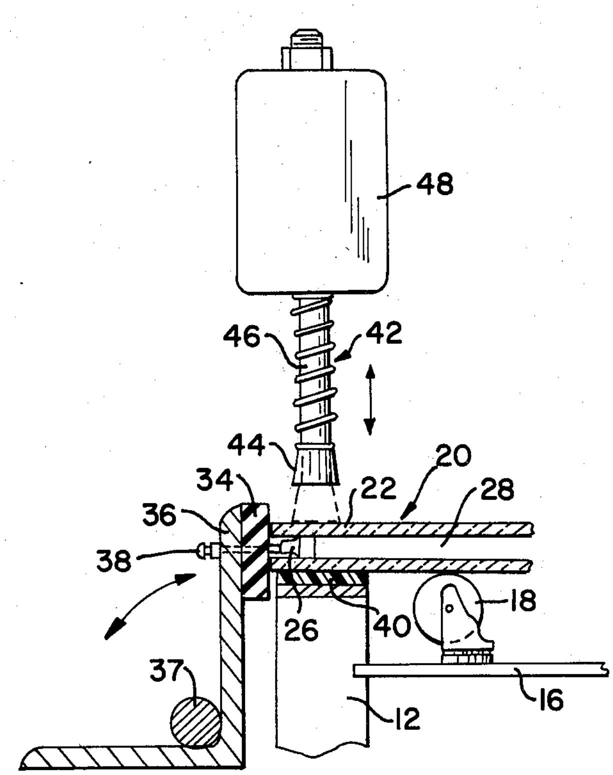
FIG. 3 is a cross-sectional view taken on lines 3—3 of FIG. 2 and illustrating in detail the aligning and clamping assemblies.
Figure 4:
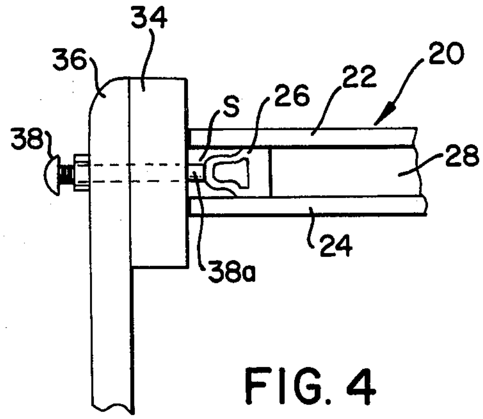
FIG. 4 is a detailed view similar to FIG. 3 illustrating the aligning apparatus for the spacer of the glass assembly.
Figure 5:
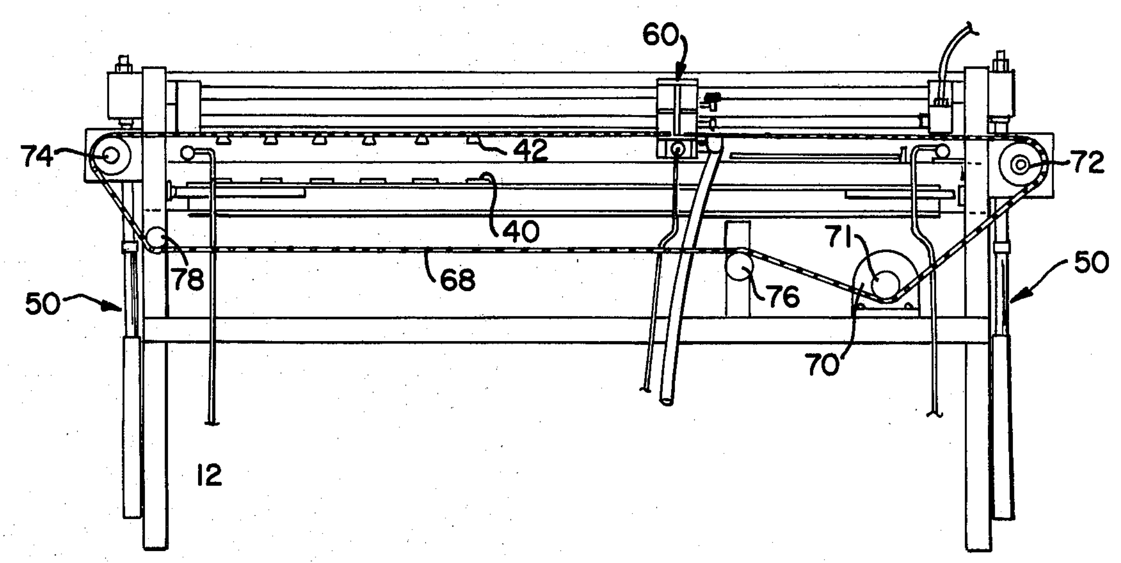
FIG. 5 is a rear elevational view of the apparatus shown in FIG. 1.
Figure 6:
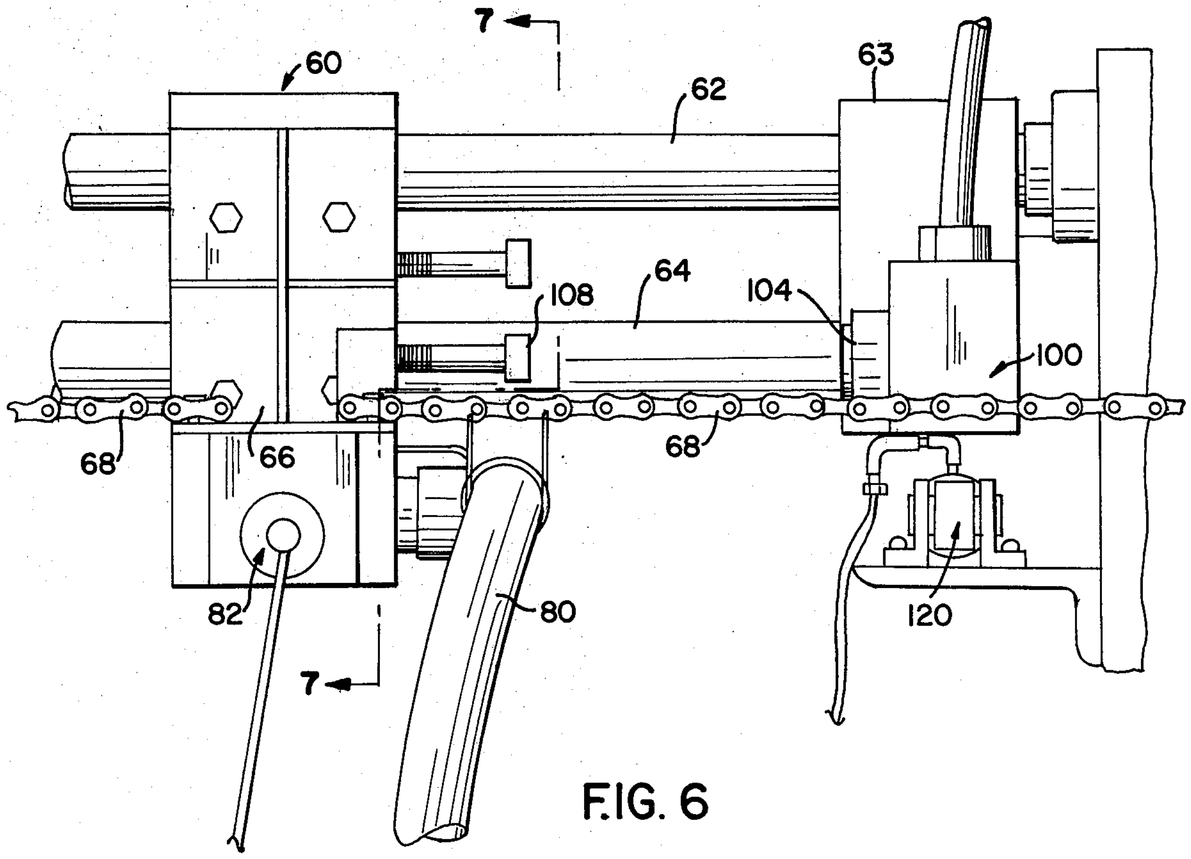
FIG. 6 is an elevational view of a portion of the apparatus shown in FIG. 5 illustrating the sealant applying head and its guides.

Referring to FIGS. 2, 3 and 4, it will be seen that the workpiece 20 includes an assembly for forming insulating glass and includes an upper panel of glass 22, a lower panel of glass 24, a peripheral spacer 26, and an air space 28, with the edges of the panels 22, 24 and the spacer 26 defining a space S for receiving sealant material. To form this assembly 20 before it is placed on the work supporting table 14, spacers 26 are placed along edges of a panel of glass 24. Then, the upper panel of glass 22 is placed over the spacers to form the preliminary assembly which is sealed by the apparatus of the present invention.

Once the assembly 20 has been formed, it is placed on rollers 18 on the work supporting table 14 and moved into a corner of the table having aligning apparatus 30. More particularly, the aligning apparatus 30 includes an upstanding member 32 for engaging the left edge of the assembly 20. The aligning apparatus 30 further includes a plurality of upstanding members 34 for engaging the rear edge of the assembly 20. Upstanding members 34 are mounted on an angle member 36 which is pivoted about a member 37 by a piston-cylinder arrangement 39. In this manner, members 34 are pivoted into and out of position for engaging the work assembly 20, in a manner to be explained. Upstanding members 32 and 34 include adjustable pins 38 having ends 38*a* which are adapted to be inserted between the upper and lower glass panels 22, 24 and to push the spacer member 26 inwardly so that it is spaced the proper distance from the edge of the work assembly 20 to define the proper spacing S. In addition, as will also be understood, upstanding members 32, 34 are engaged by the edges of upper and lower glass panels 22, 24 to align these members. In this manner, aligning apparatus 30 operates to align the left edge and rear edge of the assembly 20 so that the upper and lower glass panels 22, 24 and the spacers 26 exposed between the glass panels are all properly oriented with respect to each other.

Once the aligning operation has been completed, the work assembly 20 is ready to be clamped. The clamping assembly includes lower clamping members 40 disposed along the rear edge of the work assembly 20. The clamping assembly further includes a plurality of upper clamping members 42 each of which includes an upper work engaging member 44 and a vertically extending rod 46 mounted on a crossbar 48. Each end of the crossbar 48 is connected to a device 50 for actuating the upper clamping members 42. The device may be of any suitable type, such as a piston 52 connected to crossbar 48 operated by a cylinder 54 suitably mounted on the frame 12. Once the plurality of clamping members 42 engage and clamp the work assembly 20 in a fixed position on the work supporting table 14, it is ready to have the sealant applied thereto.

Referring now to FIGS. 5, 6, 7 and 8, the sealant applying apparatus is shown. The sealant applying apparatus includes a sealant applying head 60 which is mounted for reciprocating movement on longitudinally arranged parallel bars 62, 64. The rear of the sealing head 60 includes a supporting member 66 to which is attached a conveyor-type chain 68 for moving the sealing head 60 along bars 62, 64. As seen most clearly in FIG. 5, chain 68 traverses a path defined by gears 72 and 74 mounted at each end of the apparatus so that these wheels define the upper run of the chain 68. The lower run of the chain is defined by gears 76, 78 and a driving motor 70 having a driving gear 71 mounted thereon for engaging and driving chain 68. Motor 70 is of the reversible type so that chain 68 can be driven back and forth to reciprocate sealant head 60 back and forth along the upper run of the chain 68, in a manner to be explained.

Figure 7:
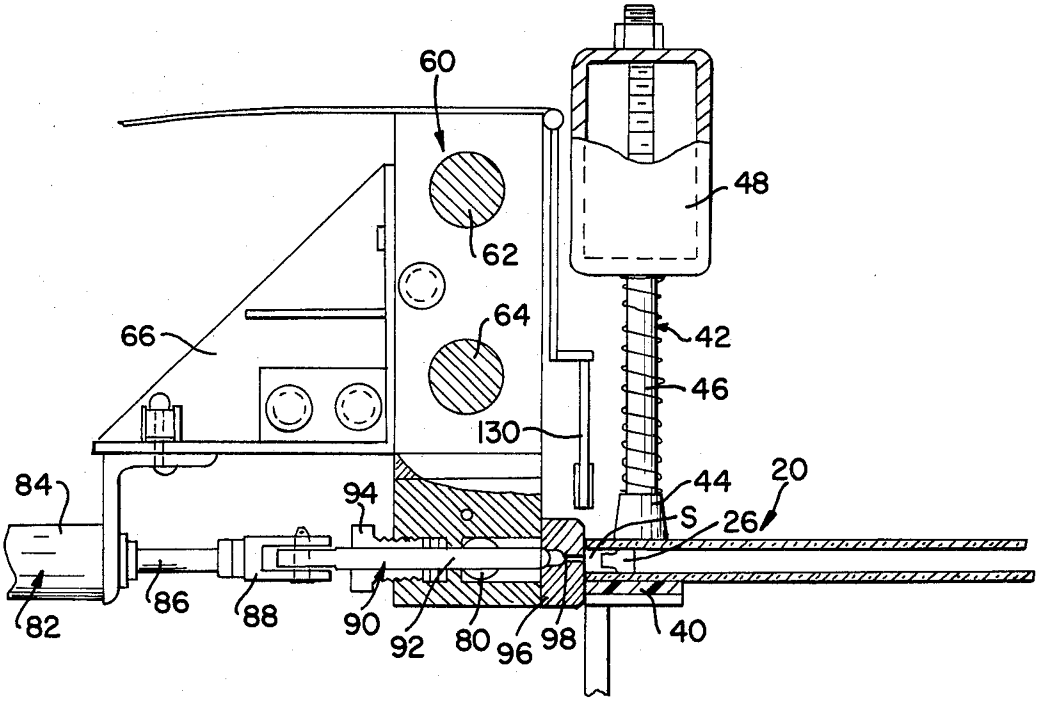
FIG. 7 is a side elevational view, partly in section, and illustrating the relationship betwen the clamping assembly, the work piece and the nozzle of the sealant applying head.
Figure 8:
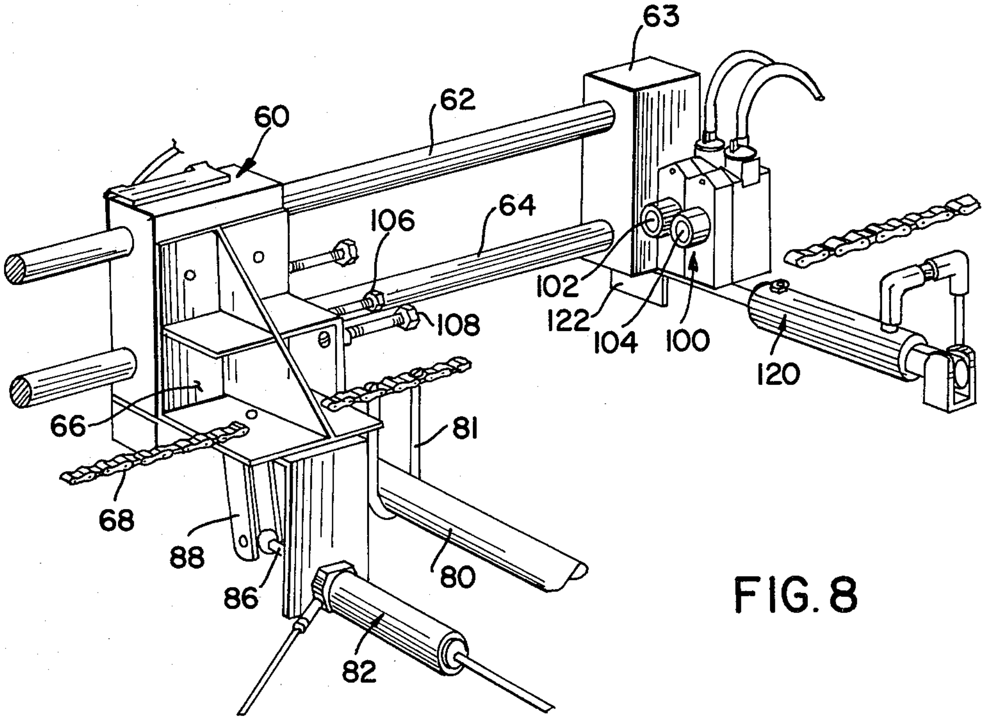
FIG. 8 is a perspective view illustrating further details of the sealant applying head.

Referring now to FIGS. 7 and 8, there is shown the apparatus for supplying sealant to sealing head 60 so that it may apply sealant to the rear edge of work assembly 20 to fill the space S between the spacer 26 and the edges of the upper and lower glass panels 22, 24 with sealant material. The sealant material is applied to sealant head 60 via a hose assembly 80 mounted on chain 68 by a bracket 81. The sealant can be of any suitable type for sealing the insulating glass assembly 20. For example, one sealant typically employed is Hot Melt Butyl sealant. Sealant head 60 has mounted thereon a trigger assembly 82 which includes a cylinder 84, a piston 86 and a U-shaped coupling 88 connected to a nozzle assembly 90. The nozzle assembly 90 is formed by a tubular member 92 surrounded by a suitable seal 94 and the tubular member 92 is connected to hose 80 for receiving sealant material. The forward edge of the nozzle assembly 90 includes a nozzle head 96 having two holes 98 formed therein for injecting the sealant material supplied by hose 80 to nozzle assembly 90 into the space S of the glass assembly 20.

As shown in FIG. 8, the ends of the bars 62, 64 are connected to a block 63 which has a switching assembly 100 mounted thereon and which includes switches 102, 104. These switches are actuated by members 106, 108 formed on sealant head 60. In this manner, when sealant head 60 returns to its initial position, member 106 engages switch 102 and deenergizes motor 70 to stop the movement of chain 68 and sealant head assembly 60. In addition, when member 108 engages switch 104, it allows member 36 to be returned to its upright position.

As also seen in FIG. 8, a piston and cylinder assembly 120 is connected to a plate 122 formed on the bottom of block member 63 on which the longitudinally extending bars 62, 64 are mounted. A similar arrangement 120, 122 is mounted on the opposite end of the bars 62, 64 (not shown). In this manner, actuation of assembly 120, 122 operates to pivot block 122 about upper rod 62 and away from the glass assembly 20. As will be explained herein, this pivoting action occurs after the sealant has been applied by sealant head 60 and is being returned to its initial position. In this manner, as sealant head 60 is pivoted out of engagement with glass assembly 20, it can be moved from its finished position to its initial position without interfering with the sealant material which has been applied during the forward movement of the sealant head 60.

Figure 9:
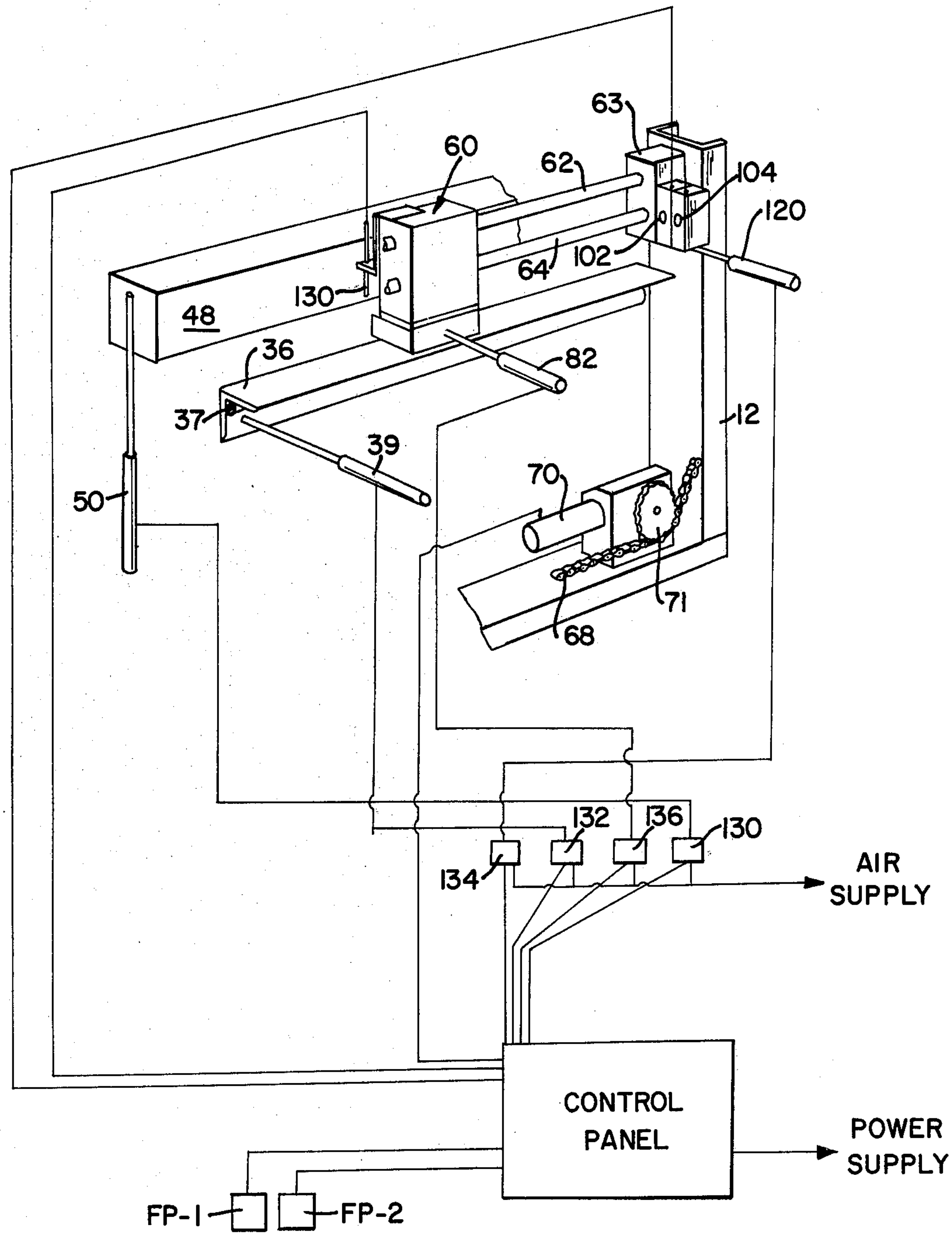
FIG. 9 is a control diagram of the apparatus of the present invention diagrammatically illustrating its components.

A brief description of the operation of the apparatus of the present invention will now be provided, with particular reference to the control apparatus shown in FIG. 9 for accomplishing the sequence of operation. More particularly, the glass assembly 20 is placed on work supporting table 14 and is moved on rollers 18 until the work assembly engages upstanding stop members 32, 34 for aligning and properly positioning the work assembly 20 relative to sealant head 60. Foot pedal FP-1 is then depressed and operates to actuate piston and cylinder arrangements 50 via solenoid 130. Clamping head 48 is moved downwardly so that the plurality of upper clamping members 42 are brought into engagement with the upper surface of work assembly 20 to clamp it against lower clamping members 40. Once this is completed, the control panel energizes solenoid 132 to actuate piston and cylinder arrangement 39 to pivot angle member 36 out of its upstanding position. Once this is completed, foot pedal FP-2 is actuated which, via the control panel, energizes motor 70 and drives chain 68 to move sealant applying head 60 from its initial position and along the upper run of chain 68. At the same time, a solenoid 134 is energized to actuate piston and cylinder arrangement 120 to pivot block 63 inwardly and press the sealant head 60 and nozzle 98 against the edge of the glass assembly 20. A sensor, such as a photocell 130, is mounted on the sealing head 60, so that as the sealant head is moved into engagement with the edge of the glass assembly 20, the photocell 130 senses the edge of the glass. Photocell 130 signals the control panel which energizes a solenoid 136 to actuate trigger assembly 82 causing sealant material to flow from base 80 via nozzle assembly 90 into the space S, as the sealant head 60 traverses the upper run of the chain 68.

The sealant head 60 continues to move along the glass assembly 20 applying sealant material, until photocell 130 senses the edge of the glass assembly. In response, photocell 130 operates to reverse the drive of reversible motor 70. In addition, piston-cylinder arrangements 120 are operated to pivot sealant head 60 away from the edge of the glass assembly 20 so that the sealant head 60 may be returned to its initial position without engaging the sealant material that has been applied to the glass assembly 20. As a result, sealant head 60 moves in the reverse direction towards its initial position. When member 106 engages interlock switch 102, it operates to deenergize motor 70 and to stop the movement of sealant applying head 60 at its initial position. The clamping assembly piston-cylinder arrangements 50 are then deactivated to lift clamping head 48 and to release upper clamping members 42. In this manner, the glass assembly 20 is ready to be rotated 90° so that the next edge of the work assembly 20 may have the sealant applied thereto.

Although the apparatus has been illustrated with two operating switches FP-1 and FP-2, it is understood that the apparatus may be made entirely automatic by employing only a single start switch to commence the entire sequence of aligning, clamping and applying sealant.

In view of the foregoing, it will be appreciated that there has been provided in accordance with the present invention a simple and efficient apparatus for performing all of the functions necessary to apply sealant to insulating glass assemblies on a mass production basis. This is accomplished with a minimum of handling and the glass assembly is automatically aligned, clamped and sealed.

A latitude of modification, change and substitution is intended in the foregoing disclosure and, in some instances, some features of the invention will be employed without a corresponding use of other features. Accordingly, it is appropriate that the appended claims be construed broadly in a manner consistent with the spirit and scope of the invention herein.

What is claimed is:

1. Apparatus for applying sealant material to a workpiece assembly, wherein said workpiece assembly includes two planar members separated by at least one spacer, comprising:

- a work supporting surface for receiving said workpiece assembly;
- means for aligning said planar members and said spacer of said workpiece assembly relative to each other and in a fixed position relative to a sealant applying means;
- said aligning means including stop members for engaging an exposed edge of said workpiece assembly;
- means for moving said stop members out of engagement with said exposed edge of said workpiece assembly;
- means for clamping said workpiece assembly in said fixed position on said supporting surface with at least one edge exposed for receiving sealant material;
- means for applying sealant material being mounted to face the exposed edge of said workpiece assembly and operable to apply sealant material when said stop members are moved out of engagement with the exposed edge of said workpiece assembly; and
- means for moving said sealant applying means relative to said workpiece assembly to apply sealant material along the edge of said workpiece assembly.

2. Apparatus in accordance with claims 1 wherein said stop members includes means for positioning said spacer relative to said planar members of said workpiece assembly.

3. Apparatus in accordance with claim 1 wherein said aligning means includes means for engaging and aligning the planar members and spacer along a second edge of said workpiece assembly.

4. Apparatus in accordance with claim 1 wherein said work supporting surface includes a plurality of rollers for moving said workpiece assembly into a clamping position.

5. Apparatus in accordance with claim 1 wherein said clamping means includes a plurality of clamping members, and means for actuating said plurality of said clamping members relative to a surface of said workpiece assembly.

6. Apparatus in accordance with claim 1 wherein said sealant applying means includes a sensor for sensing the edge of said workpiece assembly, and in response thereto, means for signaling said moving means to reverse the direction of movement of said sealant applying means.

7. Apparatus in accordance with claim 1 further including guiding means for guiding the movement of said sealant applying means relative to the edge of said workpiece assembly.

8. Apparatus in accordance with claim 7 wherein said moving means includes driving means for driving said sealant applying means relative to said guiding means and the exposed edge of said workpiece assembly.

9. Apparatus in accordance with claim 1 wherein said sealant applying means includes a nozzle assembly for supplying sealant material to the exposed edge of said workpiece assembly.

10. Apparatus in accordance with claim 9 further including means for actuating said nozzle assembly to supply sealant material to the edge of said workpiece assembly.

11. Apparatus in accordance with claim 1 further including means for pivoting said sealant applying means into and out of engagement with the edge of said workpiece assembly.

12. Apparatus in accordance with claim 1 wherein said work supporting surface includes a starting position, and means disposed at said starting position for sensing the return of said sealant applying means, and in response thereto, means for deactivating said moving means to stop the movement of said sealant applying means at said starting position.

13. Apparatus in accordance with claim 1 wherein said aligning means includes means for positioning said spacer adjacent to said exposed edge to define a space for receiving said sealant material.

* * * * *